2,903,257
SIMULTANEOUS CONTROL MECHANISM FOR SHUTTER FORMING LATHS

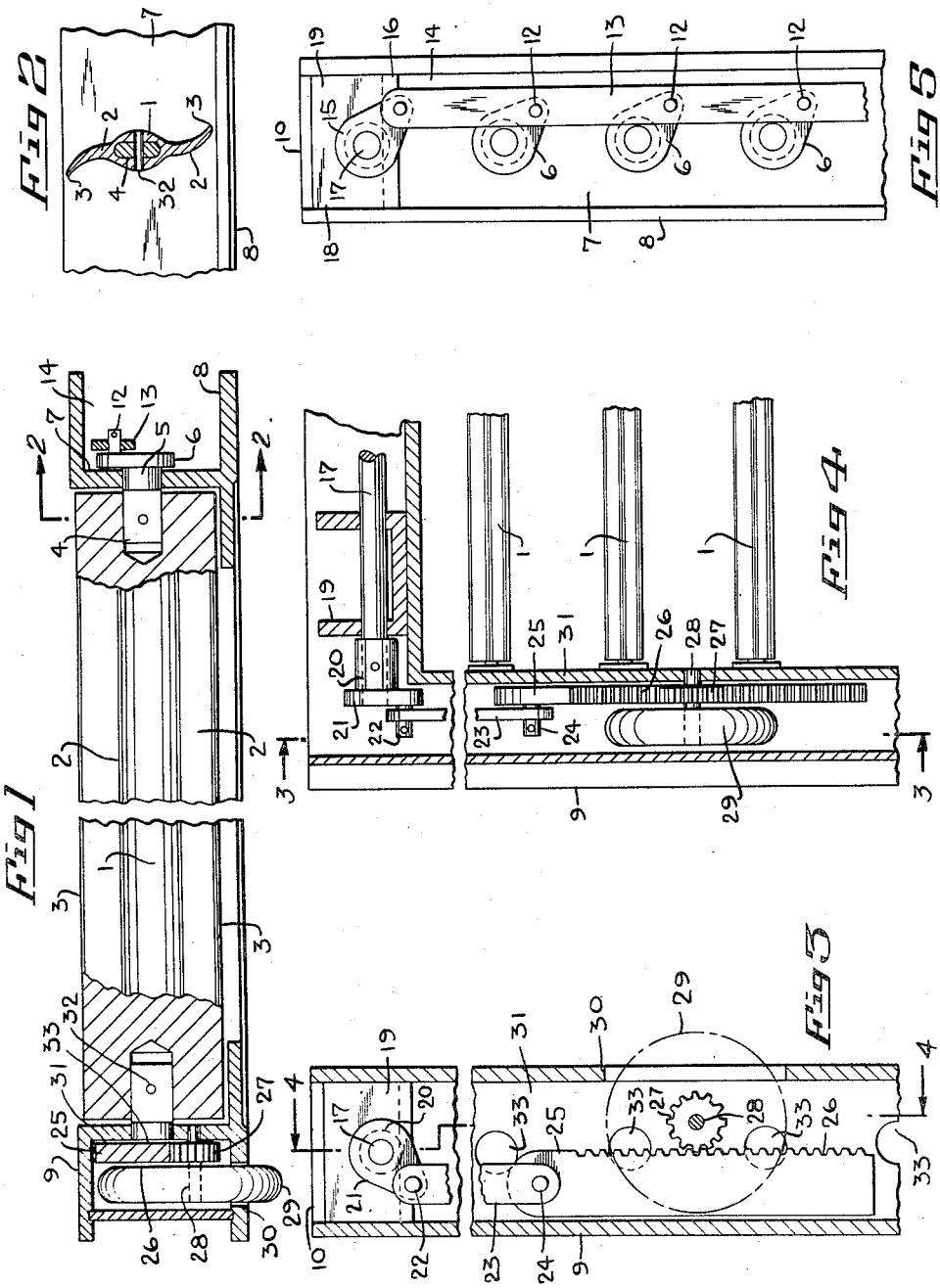

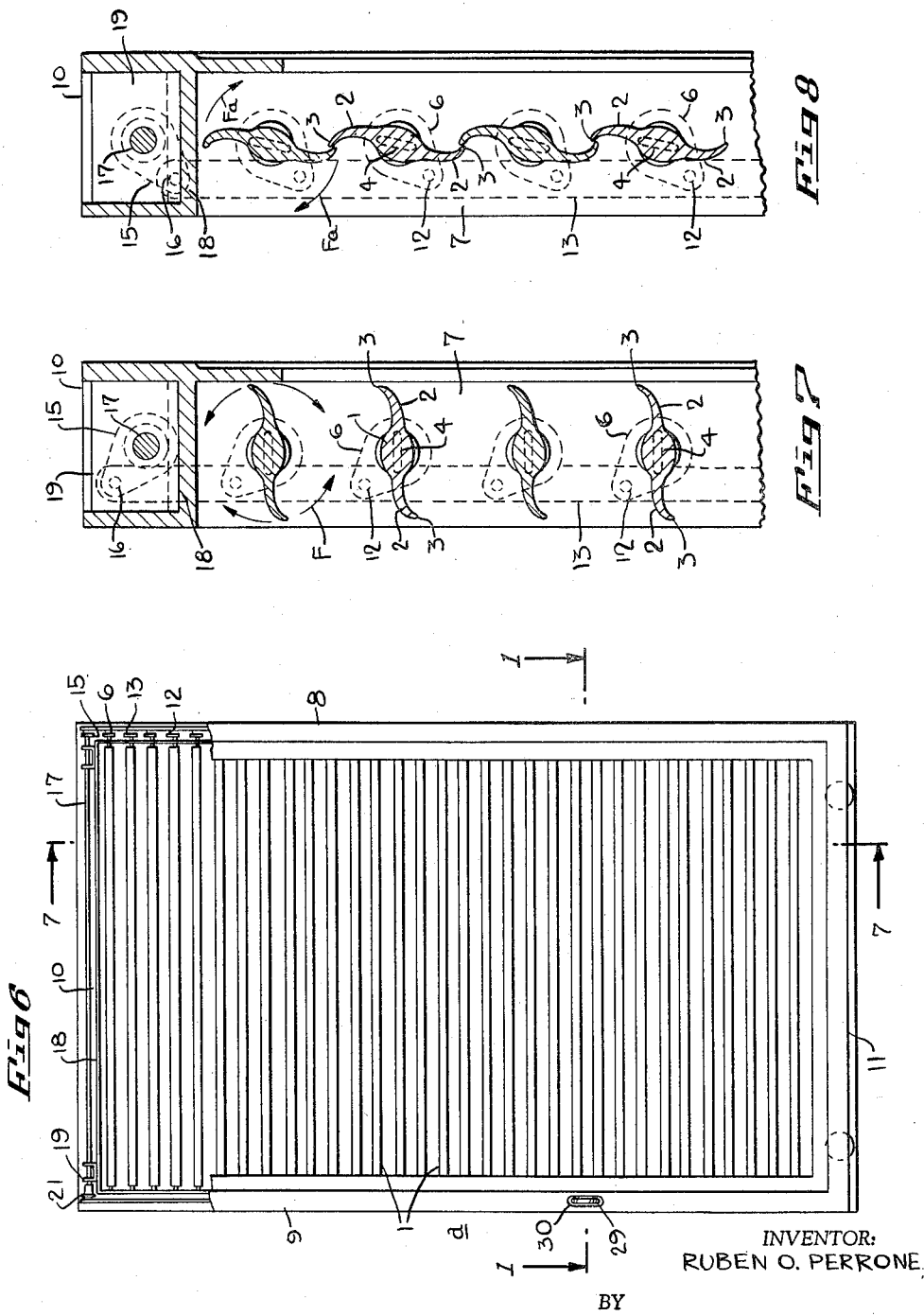

Ruben O. Perrone, Buenos Aires, Argentina

Application May 3, 1955, Serial No. 505,815

1 Claim. (Cl. 268—96)

This invention refers to a simultaneous control mechanism for shutter-forming laths based on a relation of cooperatively interconnected elements by which means a technical solution is arrived at which makes it possible to operate the laths so that they are placed in the desired position according to the degree of opening or shutting required.

There exist many systems of operating shutter-forming laths which function by imparting to the laths a rotative movement about their geometric axes, based on a complicated arrangement of the component parts of their respective mechanisms and this, apart from considerations regarding their greater or lesser degree of efficiency, causes a higher cost of the shutters to which must be added frequent repairs due to the facility with which these shutters get out of order.

The mechanism of this invention takes into account the difficulties observed in known systems of control and is the result of careful studies with a view to arriving at an assembly permitting an easy operation of the laths in order to have them move rotatively about their geometric axes, which assembly is at the same time highly responsive to control to allow for the rotative movement of the laths within controllable revolving arches so as to place them in positions comprised within the folded one to shut completely the opening surrounded by the laths-carrying frame and the component parts that make up the mechanism in question, and the position of partial or total opening according to the amount of clearance required for ventilation and filtration of air towards the interior.

These and other structural and functional factors will be apparent from the following description together with the accompanying drawings in which:

Figure 1 is a fragmentary view of the shutter on an enlarged scale showing a section along the plane 1—1 of Figure 6.

Figure 2 is a fragmentary detail of the shutter in section along the plane 2—2 of Figure 1.

Figure 3 is a fragmentary detail of the shutter showing a section along the plane 3—3 of Figure 4.

Figure 4 is a fragmentary detail of the shutter showing a section along the plane 4—4 of Figure 3.

Figure 5 is a fragmentary detail of the shutter showing in profile the jamb to which are related the cams and their operating bar.

Figure 6 is a view in elevation giving a front view of the assembly that makes up the shutter.

Figure 7 is a section along plane 7—7 of Figure 6, showing fragmentarily and on an enlarged scale the shutter with the lath in its position of maximum opening.

Figure 8 is a view similar to that of Figure 6, with the laths in closed position folded against one another.

In these figures the same reference numbers and letters indicate like or corresponding parts.

As shown in the accompanying drawings, these refer to an assembly making up the shutter in question and composed by a plurality of slats or laths 1, and the supporting frame a, as shown in Figure 6. The laths 1 have a predetermined profile with a central part of greater thickness and ellipsoidal outline and two diametrically opposed sections 2 which, following a curved profile, end in considerably sharpened edges forming longitudinal edges 3, Figures 2, 7 and 8.

The laths 1 are fastened at one of their ends to the journal 4 which forms the end of respective rods 5 extending from the end of the respective crank arms 6 which are rotatively joined, through the intermediary of said rods, to the interior wall 7 of one of the jambs 8 that makes up, together with the opposed jamb 9 and the crosspieces 10 and 11, the supporting frame a.

The crank arms 6 are joined articulately at their free end, provided for this purpose with a pin 12, pivoted to a common connecting bar 13 oscillating longitudinally in a recess 14, formed in the jamb 8, the bottom of which is formed by the wall 7, as shown in Figure 1.

The connecting bar 13 is articulately joined at its upper end to the free end of a crank arm 15 by means of a bolt 16 which starts from the end of said lever opposed to the fixed one to one of the ends of a driving shaft 17 rotatively adjusted in a groove 18 formed in the upper edge of the crosspiece 10 and guided in two bearings 19, fixed in place of said groove near both ends of same.

The shaft 17 carries fixed to its end which coincides with jamb 9, the bulk 20 of a crank arm 21, which has at its other end a pin 22 to which is articulated the upper end of a connecting rod 23 which at its other end is articulated by means of a pin 24 to the upper end of a bar 25 provided with rack teeth 26 which are engaged by the teeth of a pinion 27 fixed on a shaft 28, common to a control knob 29. The control knob 29 extends through the front of the jamb 9, provided for this purpose with a groove 30, to impart to bar 25 the linear oscillating movements, and through its intermediary to the connecting rod 23 which in turn imparts the revolving-angular movements to the crank arm 21 which in turn imparts the revolving-axial movements to shaft 18 which, through the intermediary of the crank arm 15, imparts to the connecting bar 13 the oscillating linear-alternative movements, and through its intermediary and the crank arms 6 the revolving movements are imparted to the laths 1, either in direction of arrows F in Figure 7 to bring them to the closing position shown in Figure 8, or in direction of arrows Fa of Figure 8 to bring them to the opening position shown in Figure 7, or any intermediary position comprised by partial opening.

The laths 1 are articulately joined with free revolving play at their end opposed to the one connected to the crank arms 6, to an internal wall 31 integral with jamb 9, by inserting in said end a pin 32 which starts from respective rods 33, fixed along said wall 31.

From this description and the illustration provided by the accompanying drawings the structural and functional features which characterize the assembly of the simultaneous control mechanism for shutter-forming laths are easily apparent, and it is not considered necessary to enlarge on the subject except to reserve the inventor's right to introduce subsequent modifications of details without departing from the limit and scope of the following appended claim.

Having described this invention and the way to put it into practice, I claim:

A control mechanism, for use in connection with a shutter system having a relatively thin frame defining an opening and a series of slats each pivoted to opposite sides of said frame and tiltable between opposite positions to cover and un-cover said opening, in combination, each slat being turnable about a central axis of rotation, a mechanism operable to turn simultaneously all of said slats about their axes comprising a crank arm connected to each slat near one end thereof and turnable about said central axis of rotation thereof, a connecting bar interconnected at one side of said frame to all of said crank arms and movable longitudinally, in opposite directions, to tilt all of said crank arms simultaneously, a knob pivoted to said frame near the opposite side thereof, a pinion coaxially formed on said knob, a rack movable longitudinally in opposite directions along said opposite side and meshing with said pinion and actuatable thereby, and driving means forming a driving connection between said rack and said connecting bar, said slats and mechanism throughout all their movements being confined within the outlines of said frame except a segment of said knob protruding slightly beyond the face of said frame, said driving means comprising a shaft parallel to the longitudinal extension of said slats and at right angles to said rack and said connecting bar, a crank arm affixed near each end of said shaft, a connecting rod between said rack and a crank arm of said shaft, said other crank arm being connected to said connecting bar.

References Cited in the file of this patent

UNITED STATES PATENTS

| | | |
|---|---|---|
| 301,453 | Martin | July 1, 1884 |
| 1,335,929 | Allen | Apr. 6, 1920 |
| 2,137,426 | Thompson | Nov. 22, 1938 |
| 2,164,814 | Griffith | July 4, 1939 |
| 2,168,347 | Huff | Aug. 8, 1939 |
| 2,199,562 | Griffin | May 7, 1940 |
| 2,257,056 | Huff | Sept. 23, 1941 |
| 2,551,590 | Ferri | May 8, 1951 |
| 2,617,156 | McMurray | Nov. 11, 1952 |
| 2,667,950 | Bancroft | Feb. 2, 1954 |
| 2,758,345 | White | Aug. 14, 1956 |